United States Patent [19]
Chavez, Jr. et al.

[11] Patent Number: 5,940,758
[45] Date of Patent: Aug. 17, 1999

[54] WIRELESS HANDSET PAGING UTILIZING CONNECTION ENDPOINT SERVICE IDENTIFIERS

[75] Inventors: David L. Chavez, Jr., Thornton; Forrest L. Coleman, Denver, both of Colo.

[73] Assignee: Lucent Technologies Inc., Murray Hill, N.J.

[21] Appl. No.: 08/672,734

[22] Filed: Jun. 28, 1996

[51] Int. Cl.[6] .................................................... H04B 7/00
[52] U.S. Cl. ........................ 455/432; 455/435; 455/524
[58] Field of Search ................................... 455/524, 414, 455/560, 561, 432, 435; 395/200.57, 200.58, 311, 312, 285; 370/331, 469, 522

[56] References Cited

U.S. PATENT DOCUMENTS

| | | | |
|---|---|---|---|
| 5,007,051 | 4/1991 | Dolkas et al. | 455/524 |
| 5,386,466 | 1/1995 | Bales et al. | 455/414 |
| 5,442,633 | 8/1995 | Perkins et al. | 455/524 |
| 5,598,458 | 1/1997 | Bales et al. | 455/414 |

Primary Examiner—Salvatore Cangialosi
Attorney, Agent, or Firm—John C. Moran

[57] ABSTRACT

PCS switching system processes the movement of a wireless set from one paging zone to another paging zone or from one base station to another base station at the lowest software layer in the PCS switching system thereby reducing the amount of processing required of the PCS switching system. Each base station is interconnected to the wireless switching network by communication links. When a wireless set registers on the wireless switching network via a base station, a physical object is established that will control the physical protocol used to communicate with the wireless set. In addition, a software object is established that will control the first layer of software protocol to communicate with the wireless set. When the wireless set moves to a new base station that interconnects to the wireless switching network, it initiates contact with the new base. This initialization causes a new physical object to be established. The software object is also updated to use the new physical object instead of the one established on registration. Thus, information for the wireless set is routed to the new base station via the new physical object; and hence, communication with the wireless set is maintained without going above the first software control layer.

12 Claims, 11 Drawing Sheets

WIRELESS HANDSET PAGING UTILIZING CONNECTION ENDPOINT SERVICE IDENTIFIERS

TECHNICAL FIELD

This invention relates to wireless telecommunication switching systems, and, in particular, to the paging of wireless handsets by such switching systems.

BACKGROUND OF THE INVENTION

Within the art, personal communication service (PCS) is provided in paging zones. The PCS switching system identifies each registered wireless set as being in a particular paging zone. When the PCS system receives an incoming call for a particular wireless set, the PCS system requests that all base stations within the paging zone of the wireless set transmit messages (paging messages) requesting that the wireless set identify itself to one of the base stations. A paging zone is normally related to a physical space. In addition, a paging zone can have a number of wireless base stations so as to provide high call capacity within a given paging zone. In general, each PCS base station can handle a small number of wireless sets that are actively engaged in a telephone call. This number varies from two to twelve active wireless sets at any given time. In the prior art, when an incoming call is received for a wireless set by the PCS switching system, the latter system requests that all base stations within the paging zone send a paging message to the destination wireless set. In PCS switching systems, there can be hundreds of wireless base stations within a paging zone. This results in very expensive algorithms and expenditure of a large amount of real time to accomplish transmitting messages to all of the base stations within the paging zone. The base stations transmit the paging message over what is often referred to as a paging channel which is shared by all of the base stations.

The user of PCS switching systems want a large number of base stations in each zone so that they will have high call capacity within a given physical area. Similarly, since each time a wireless set enters a new paging zone it must reregister, the vendors of PCS switching systems want paging zones large physical areas so as to reduce the number of registrations that must be performed by the PCS switching system. Each registration requires processing time by the PCS switching system.

SUMMARY OF THE INVENTION

The foregoing problems are solved, and a technical advance in the art is achieved, by a PCS switching system in which the movement of a wireless set from one paging zone to another paging zone or from one base station to another base station is processed at the lowest software layer in the PCS switching system thereby reducing the amount of processing required of the PCS switching system. Each base station is interconnected to the wireless switching network by communication links. When a wireless set registers on the wireless switching network via a base station, a physical object is established that will control the physical protocol used to communicate with the wireless set. In addition, a software object is established that will control the first layer of software protocol used to communicate with the wireless set. When the wireless set moves to a new base station that interconnects to the wireless switching network, it initiates contact with the new base. This initialization causes a new physical object to be established. The software object is also updated to use the new physical object instead of the one established on registration. Thus, information for the wireless set is routed to the new base station via the new physical object; and hence, communication with the wireless set is maintained without going above the first software control layer. A first physical protocol identifier is assigned to the communication link, and a second physical protocol identifier is assigned to the other communication link. Also, a first layer of software protocol identifier is assigned to the software object. The process of routing consists of identifying the first layer of software protocol identifier with the second physical protocol identifier. Advantageously, the wireless set has an unique network identification number, and the first layer of software protocol identifier is based on the unique network identification number. In the ISDN protocol, the physical protocol identifiers are termination endpoint identifiers, and the first layer of software protocol identifier is a connection endpoint suffix.

Other and further aspects of the present invention will become apparent during the course of the following description and by reference to the accompanying drawing.

DETAILED DESCRIPTION

Figure 1:
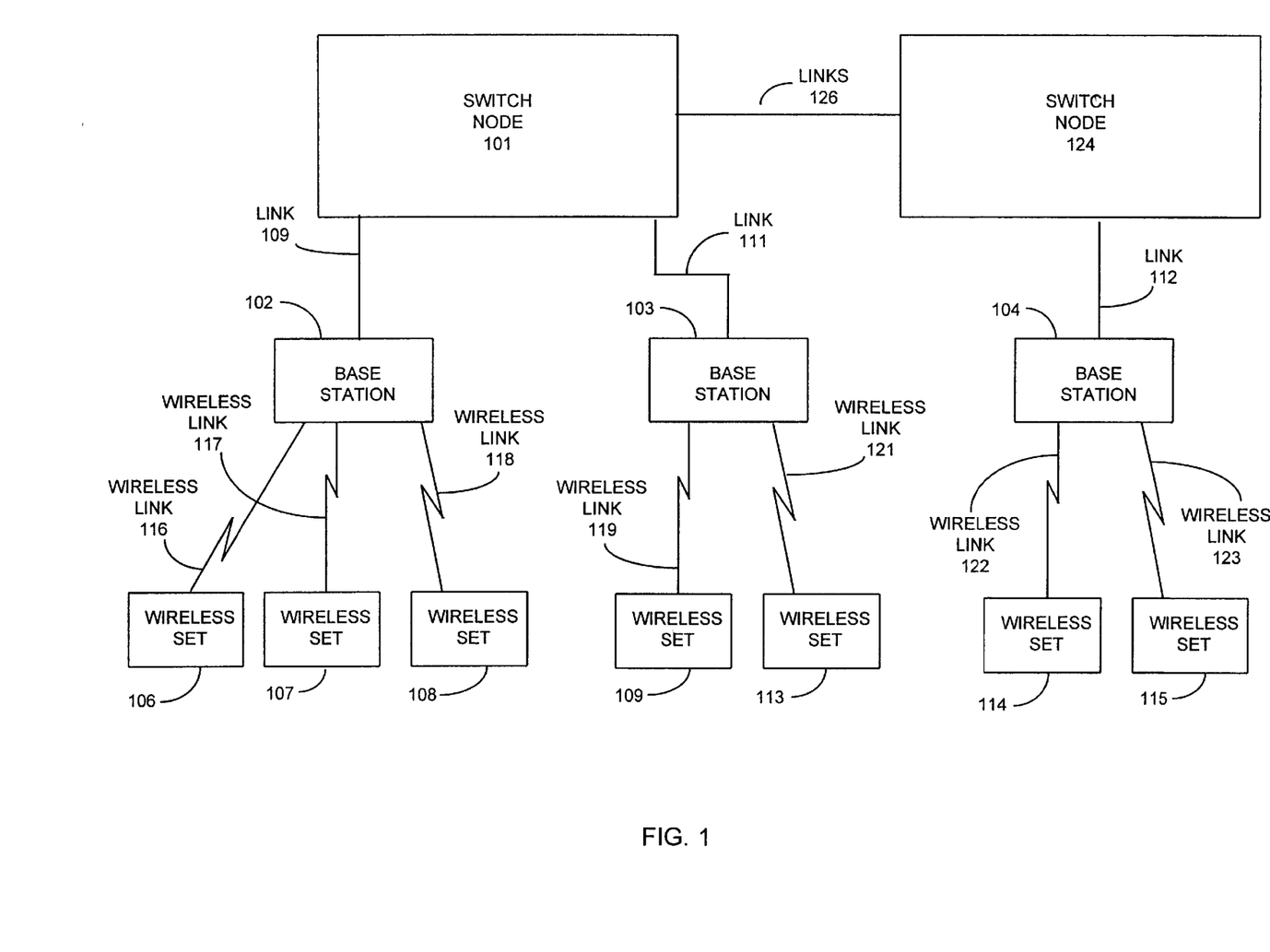
FIG. 1 illustrates, in block diagram form, a telecommunication switching system embodying the inventive concept.

FIG. 1 illustrates a PCS switching system having two switch nodes 101 and 124 interconnected by links 126. Each base station illustrated in FIG. 1 is assumed to represent one paging zone. One skilled in the art could readily see that a paging zone could consist of more than one base station. Links 109, 111, and 112 are assumed for the sake of simplicity to be basic rate interface (BRI) links. One skilled in the art could readily see that these could be links such as primary rate interface (PRI), fractional PRI links, and links based on V5.1 or V5.2 protocols. Such links allow for more than two voice conversations to be communicated on the link at a time and further allow each source of a conversation be identified. Wireless sets 106 through 115 are interconnected to the base stations via wireless links 116–123. Base stations 102, 103, and 104 each handle distinct physical locations.

When each of the handsets is initially registered with switch node 101 or switch node 124, the wireless set requests a termination endpoint identifier (TEI) from the switch node and responds to the auto allocation of the TEI by transmitting a network element identification code to the base station. The network element identification code uniquely defines the wireless handset within the switching network of FIG. 1. This code may be defined by different nomenclatures pending on the wireless protocol being supported. The switch node transmits its switch network element identification code which advantageously may be the node identification number to the wireless set which stores the switch network element identification code. Assuming that the wireless set is becoming active in the wireless switching network for the first time, the wireless set then initiates the registration process with the switch node. For example, wireless set 108 via base station 102 and link 109 would register with switch node 101. In the present example, switch node 101 is responsive to the registration request from wireless set 108 to proceed with the registration and also to establish within the various software levels of switch node 101 the ISDN protocol signaling message path for wireless set 108. At the lowest software level, the ISDN signaling path terminates on a connection endpoint suffix (CES). In accordance with the invention, the CES uniquely identifies the network element identity code. Initially in this example, wireless sets 106 through 113 are also registered with switch node 101, and wireless sets 114 and 115 are also registered with switch node 124.

When wireless set 108 moves out of the physically area serviced by base station 102 and into the physically area serviced by base station 103, wireless set 108 determines that it should be serviced by base station 103 utilizing techniques that are well known in the art. Upon making the determination that it should be serviced by base station 103, wireless set 108 requests a TEI from switch node 101 to be utilized on link 111. Switch node 101 transmits via base station 103 the node number of switch node 101 to wireless set 108. Since the node number agrees with the node number that wireless set 108 had received while being serviced by base station 102, wireless set 108 does not send a registration message to switch node 101 but rather sends only its network element identity code. Switch node 101 is responsive to the network element identity code to determine that wireless set 108 already has a CES that is receiving information from link 109. Switch node 101 now establishes the necessary internal paths so that the information for the CES for wireless set 108 is received via link 111 as identified by the TEI. These functions performed by switch node 101 are at the lowest software layer and require a minimal amount of processing power from switch node 101.

Consider now when wireless set 108 determines that it should be serviced by base station 104. As before, wireless set 108 via base station 104 requests a TEI from switch node 124. Upon receiving the TEI and the node number of switch node 124, wireless set 108 determines that switch node 124 is not switch node 101 and commences the registration process with switch node 124. As before, switch node 124 establishes the proper ISDN signaling paths for the communication with wireless set 108 via link 112, base station 104, and a new wireless link between wireless set 108 and base station 104. During the registration process, switch node 124 advises switch node 101 via links 126 that wireless set 108 is now registered on switch node 124.

Figure 2:
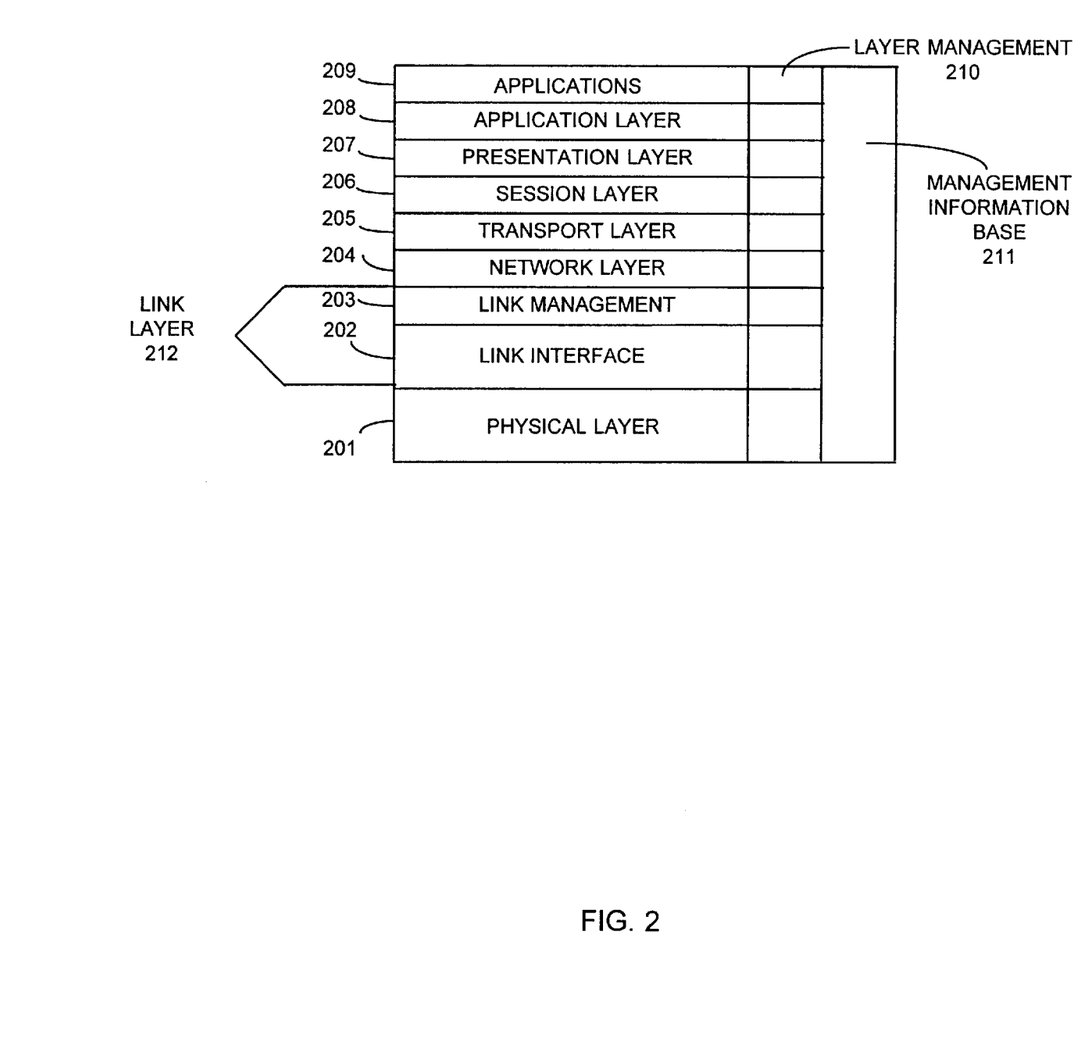
FIG. 2 illustrates a software architecture in accordance with the invention.

FIG. 2 illustrates the software architecture of the switch nodes of FIG. 1. This architecture is based on the conventional OSI model modified to implement the ISDN protocol. Further modifications have been made to this model to incorporate the invention. Software layers 205 through 209 are described in U.S. Pat. No. 5,386,466 which is hereby incorporated by reference.

The principal function of physical layer 201 is to terminate physical links using a physical protocol. Specifically, physical layer 201 is responsive for maintaining physical channels and for controlling physical sub-channels thereon. Physical layer 201 comprises a software portion and physical interfaces. Further, the software portion of physical layer 201 is responsible for the direct control of the physical interface to which physical links communicate PRI and BRI information terminate. Physical layer 201 presents to link layer 212 physical sub-channels and physical channel as entities controllable by link layer 212.

The primary function of link layer 212 is to assure that the information transmitted over a physical channel is recovered intact and in the correct order. This is accomplished using a first layer of software protocol which allows multiple communications paths—commonly referred to as logical links—to be established on a given physical channel or a physical sub-channel communicating packetized data. These logical links are used to identify and process data being communicated between layer 212 and physical layer 201. In ISDN Q.921, the protocol used is the LAPD packet protocol. Further, link layer 212 allows higher software layers to control physical layer 201 in an abstract manner.

As seen in FIG. 2, link layer 212 is divided into link interface 202 and link management 203. The reason for this division is set forth herein below. It will be helpful at this point to discuss the communication of ISDN signals over a D channel to help readers who have only a rudimentary knowledge of the communication of ISDN signals over a D channel. At link layer 212, a plurality of logical links is established on a D channel. Only one of these logical links communicates ISDN control signals, and this logical link is referred to as a logical D channel (LDC). The LDC is identified by a logical D channel number (LDCN).

Link interface 202 does the majority of the functions performed by link layer 212, including the establishment of logical links. Link management 203 identifies the various link interfaces for higher software layers. Further, link management 203 communicates information between the logical links and higher software layers.

Network layer 204 processes information communicated on the LDCs and terminates the ISDN Q.931 protocol. Hence, this layer is responsible for negotiating the utilization of system resources for the termination or origination of calls external to a switching node. The network layer controls the allocation of channels on an interface on which a call is being received or set up. Greater detail on the manner in which network software layer 204 functions with respect to setting up calls is set forth in U.S. Pat. No. 5,386,466.

Figure 3:
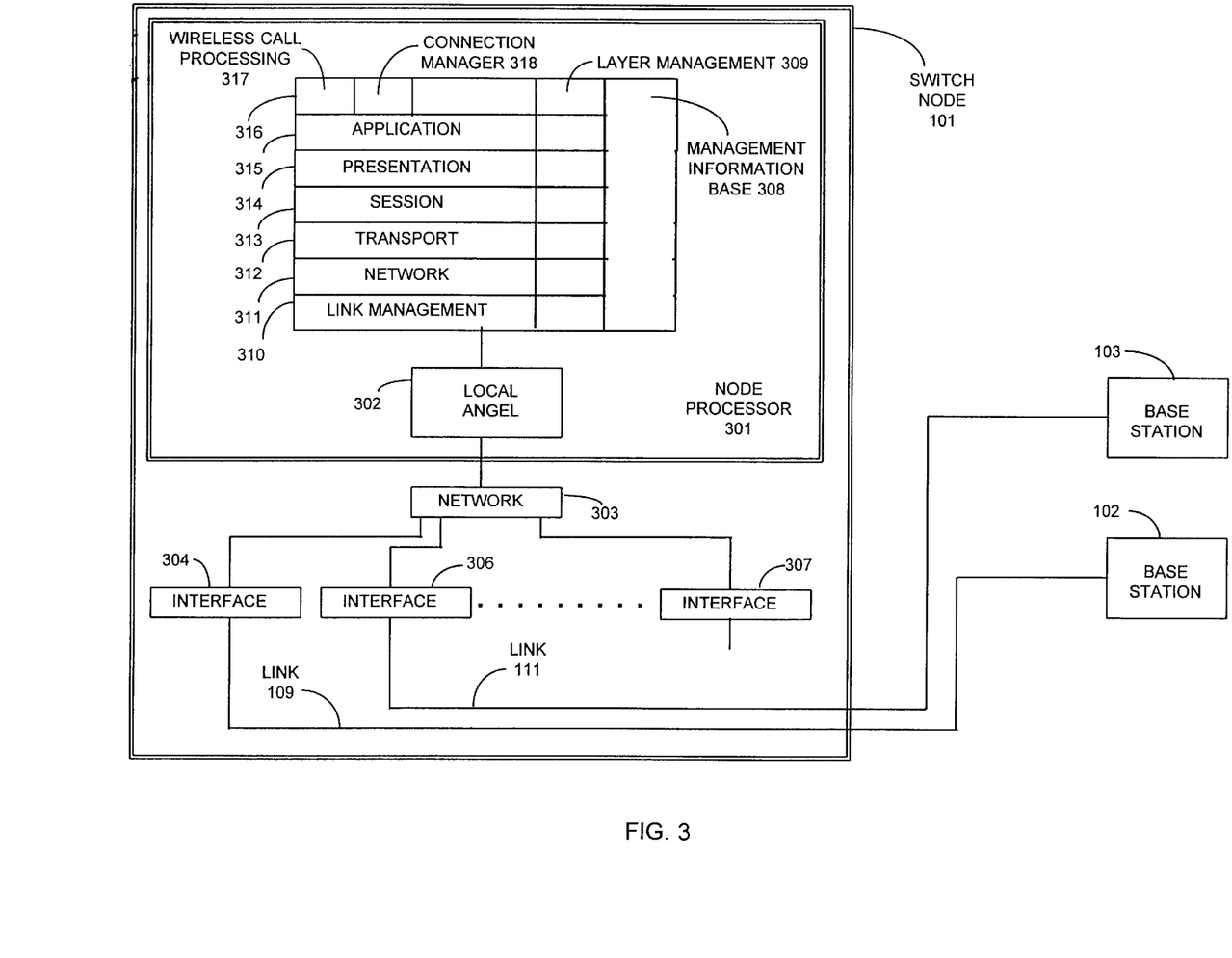
FIG. 3 illustrates, in block diagram form, greater detail of the switch node of FIG. 1.

FIG. 3 illustrates, in block diagram form, the software architecture of FIG. 2 as implemented in switch node 101. Software layers 203 through 209 are implemented on the main processor of switch node 101 which is node processor 301. Specifically, the software layers down through the link management portion of the link layer are realized by software layers denoted as 316 through 310 in node processor 301. The link interface portion of the link layer is implemented by a software module node in processor 301 designated as local angel 302.

The physical layer is jointly implemented by hardware and software. Specifically, the hardware portion of the physical layer for switch node 101 is implemented by interfaces 304 through 307. The software portion of the physical layer is performed by local angel 302.

The manner in which calls are set up to wireless sets by the interaction of wireless call processing 317 and connection management 318 and software layers 310 through 316 is well known.

Figure 4:
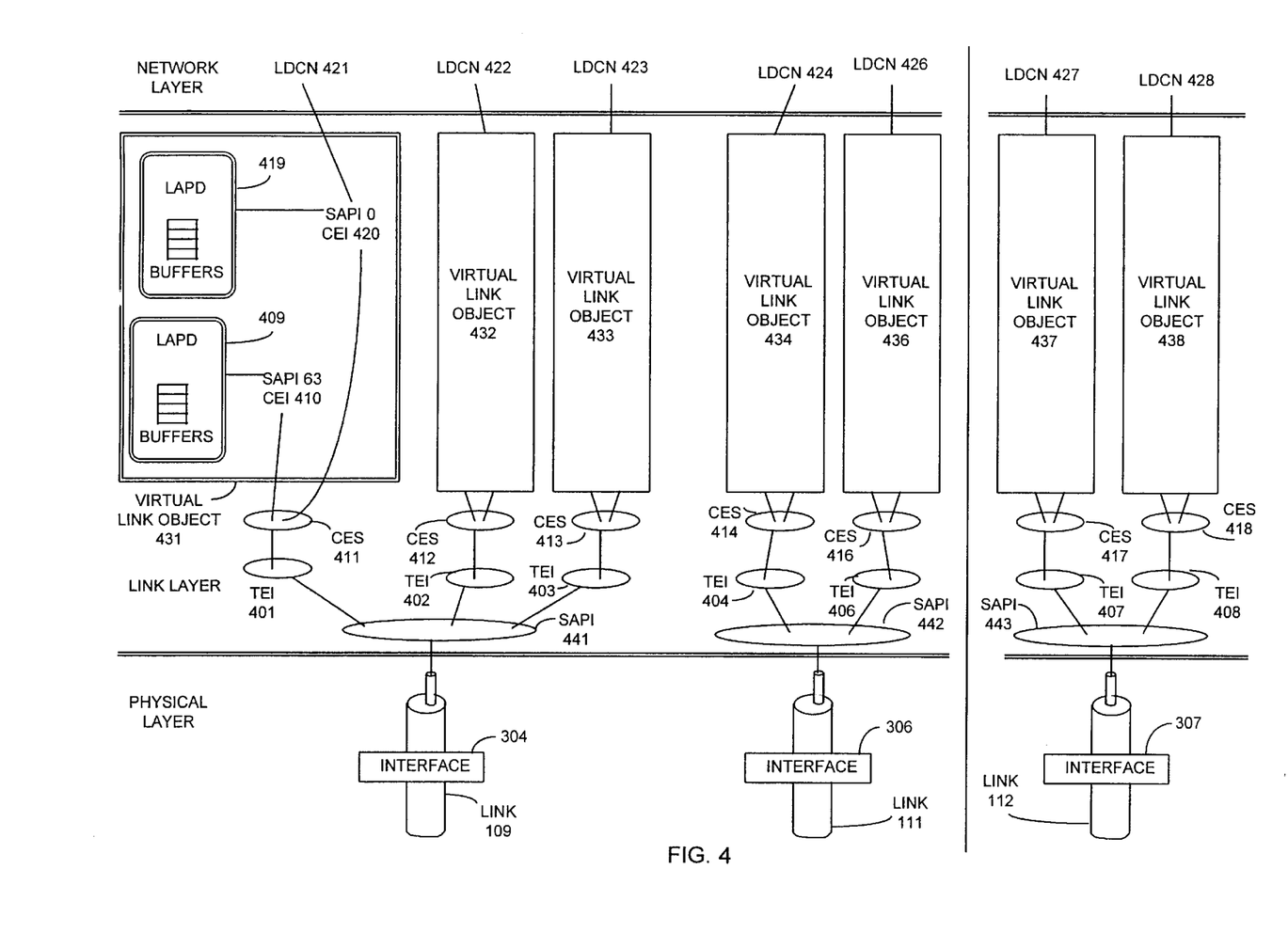
FIGS. 4, 5, and 6 depict the software structure at the link layer of a switch node.

FIG. 4 illustrates in greater detail the signaling paths that are set up within link layer 212 of FIG. 2 in switch nodes 101 and 124. When wireless set 106 initiates contact with switch node 101 via base station 102 and link 109, switch node 101 assigns to this request TEI 401 which is a physical object. As previously described, wireless set 106 then transmits its network element identity code and a registration request to switch node 102. The link layer in switch node 101 is responsive to assign CES 411 based on the network identification entity code to TEI 401 and to establish virtual link object 431. Virtual link object 431 involves establishing the LAPD protocol for CES 411 to terminate SAPI 63 utilizing buffers and protocol element 409. In addition, SAPI 0 and buffers and protocol element 419 are established. Network layer 311 then establishes LDCN 421 to identify the signaling channel for itself and higher software layers to wireless set 106. This signaling channel is communicated by SAPI 0 of virtual link object 431. The registration request is relayed to wireless call processing application 317 via layers 311–315. The normal initiation of software layers 312 and 313 that is done when any terminal is initialized on a switch node is also performed. Further information on the operations of these various higher software layers is set forth in U.S. Pat. No. 5,386,466. Each of the other wireless sets that are registered on switch node 101 or switch node 124 have a virtual link object block similar to virtual link object block 431 established. Wireless sets 107–115 are handled by virtual link object blocks 432–438, respectively. In addition, CES 412–418 and TEI 402–408 are assigned to wireless sets 107–115. Wireless set 108 initially has its signaling information terminated on TEI 403.

Figure 5:
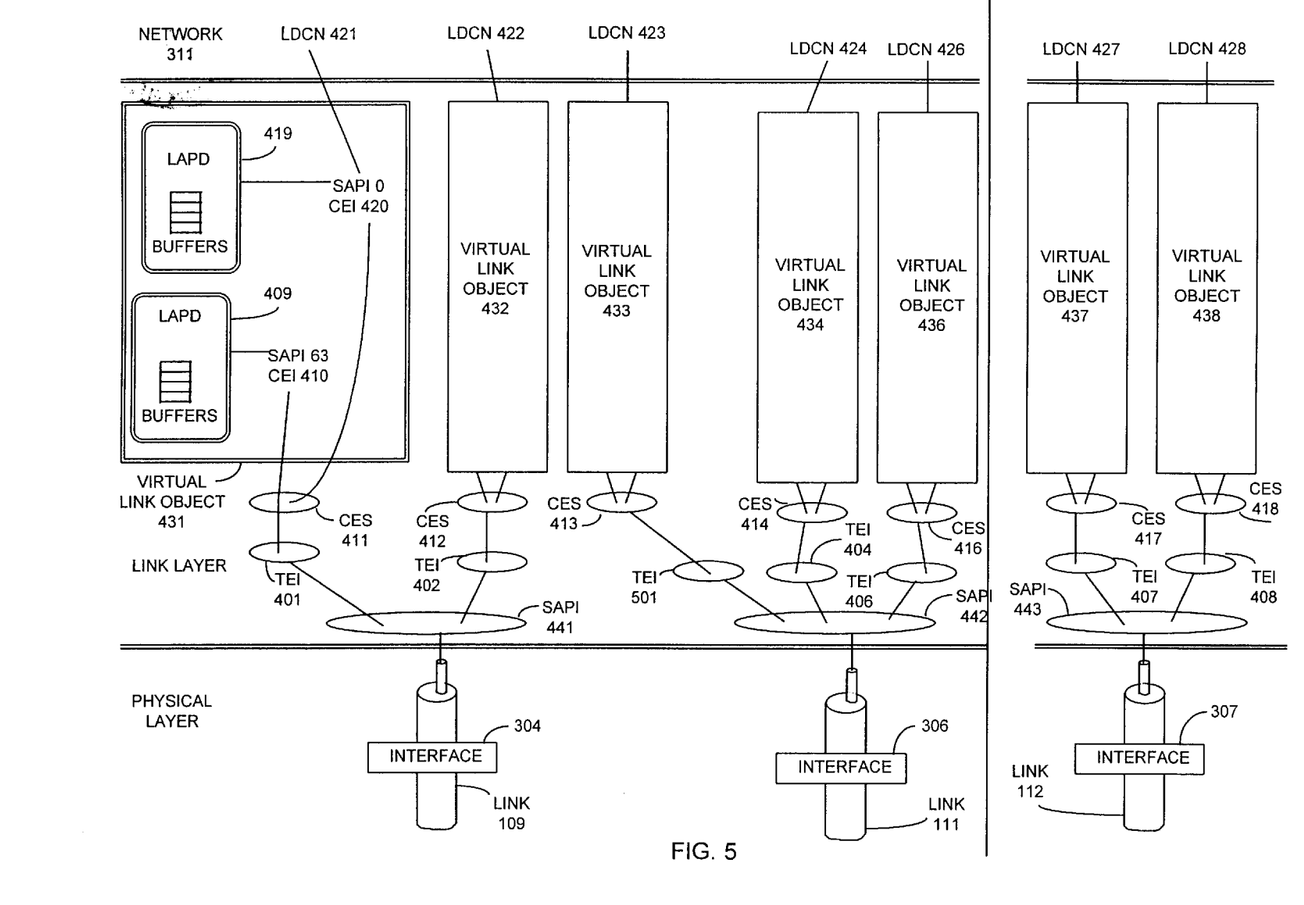

In a first example, FIG. 5 illustrates the signaling paths at the link layer after wireless set 108 has transferred itself to base station 103 from base station 102. When wireless set 108 makes initial contact with base station 103, the link layer being executed in switch node 101 assigns TEI 501 to this initial communication and transmits to wireless set 108 the node number of switch node 101. Since the node number is the same number as wireless set 108 had received when it registered on base station 102, wireless set 108 only transmits its network element identity code to the link layer of FIG. 5. The link layer of FIG. 5 is responsive to the network element identity code to determine that this network element identity code identifies CES 413. In response, the link layer establishes a logical path for information to be communicated between TEI 501 and CES 413. In addition, the link layer removes TEI 403. Virtual link objects block 433 and the higher software layers are not involved in this operation. Hence, the operation takes a minimal amount of processing power; and in addition, the buffers corresponding to those in elements 409 and 419 in virtual link object 433 are not lost. Any signaling that had been occurring when wireless set 108 transferred to base station 103 are either present in the buffers or are recovered using the LAPD protocol.

Figure 6:
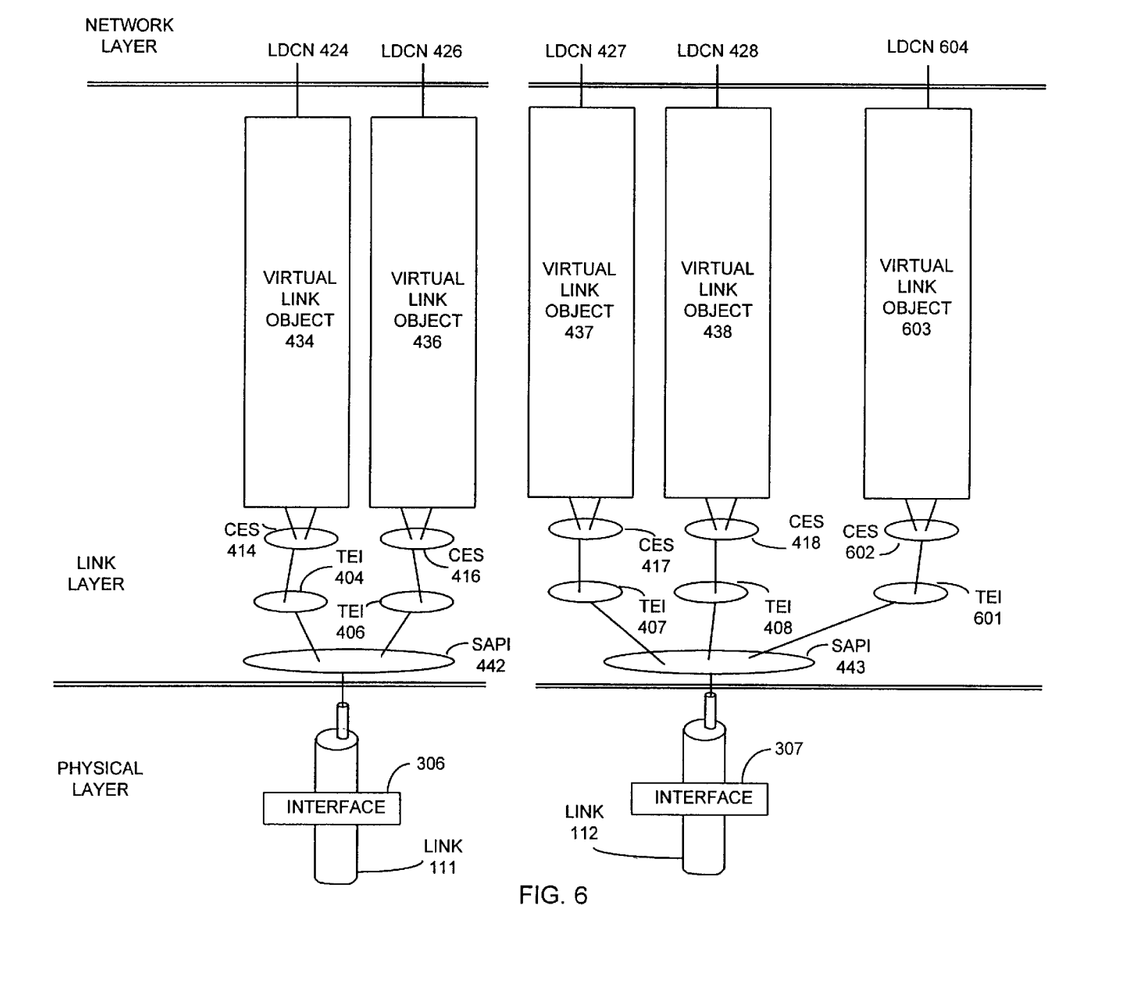

In a second example, FIG. 6 illustrates the signaling paths at the link layer after wireless set 108 has transferred itself to base station 104 from base station 103. When wireless set 108 makes initial contact with base station 104, the link layer being executed in switch node 124 assigns TEI 601 to this initial communication. In addition, the link layer establishes virtual link object 603 and CES 602. The link layer establishes communication between TEI 601 and CES 602. Since the node number received from switch node 124 is different than that received from switch node 101, wireless set 108 transmits its network element identity code to the link layer of FIG. 6 and a registration message. In response to the registration message, the network layer establishes LDCN 604. The network layer transmits the registration message, network element identity code of wireless handset 108, and the initial node number transmitted by wireless set 108 to the wireless call processing application executing in switch node 124. The wireless call processing application is responsive to this information to perform the necessary mobility operations, and the wireless call processing application transmits to switch node 101 the fact that wireless set 108 is now registered on switch node 124. Wireless call processing application 317 as illustrated in FIG. 3 in switch node 101 is responsive to this information to remove records concerning wireless handset 108 and to request that the link layer remove virtual link object 433, CES 413, and TEI 501 as illustrated in FIG. 5.

Figure 7:
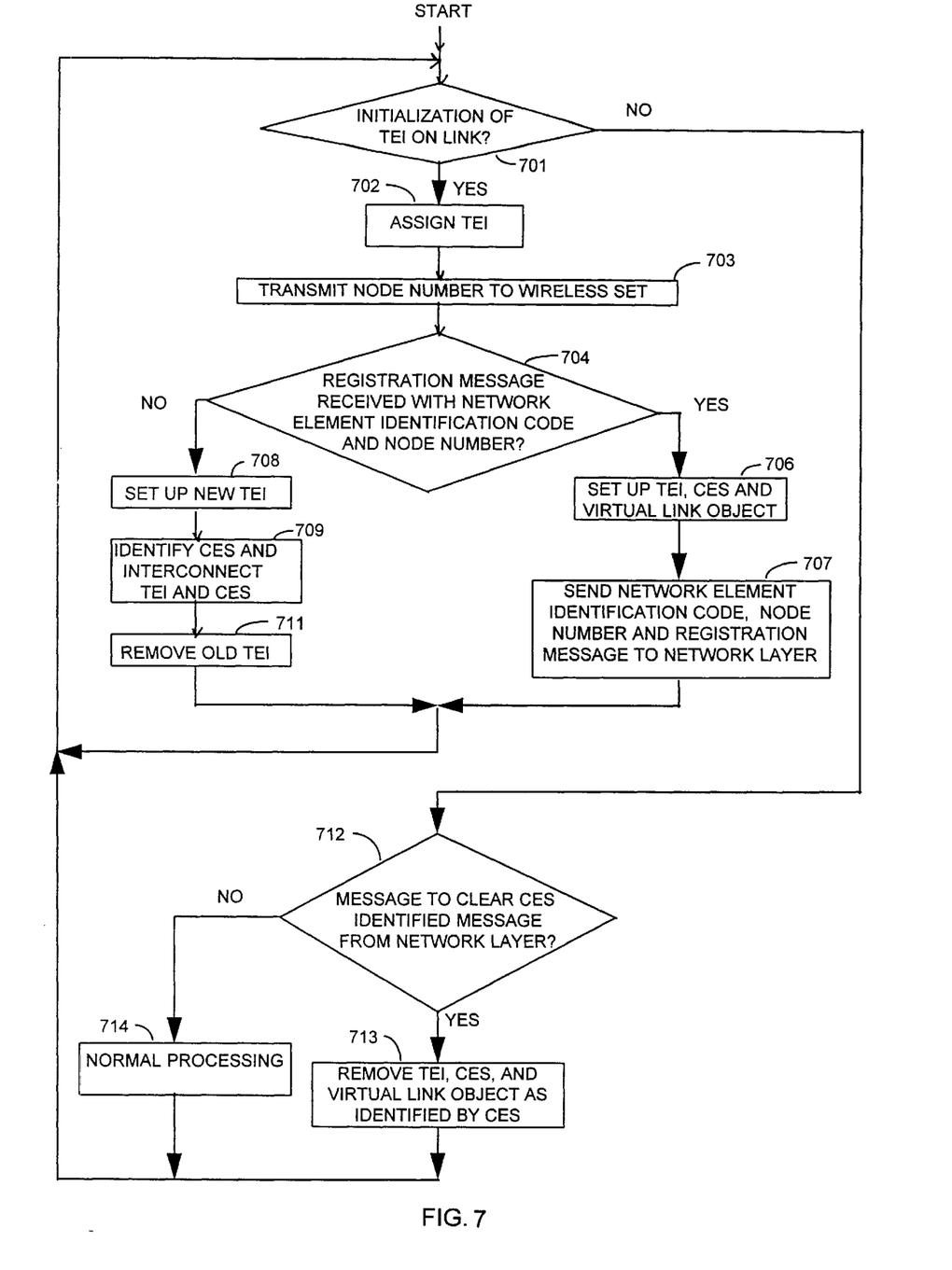
FIG. 7 illustrates, in flow chart form, the operations performed by a link layer in implementing the invention.

FIG. 7 illustrates the operations performed by the link layer of a switch node in implementing the invention. Decision block 701 determines if there is an initiation for a TEI on a link. If the answer is yes, block 702 assigns a TEI to the device that is being initiated on the link. This flow chart assumes the automatic allocation of TEI's. Next, block 703 transmits the node number of the switch node such as switch node 101 to the wireless set. Decision block 704 determines if a registration message was received along with the network element identification code of the wireless set and the node number on which the wireless set was last registered. If the answer is no, block 708 sets up the TEI such as TEI 501 in the first example illustrated in FIG. 5. Block 709 identifies the CES which is serving the wireless set such as CES 413 of the first example since the wireless set has remained on the same switch node. In addition, block 709 establishes the interconnection, the identified CES and the new TEI. Finally, block 711 removes the old TEI which the wireless set had previously been using. In the first example, the old TEI would be TEI 403 of FIG. 4. After execution of block 711, control is transferred back to decision block 701.

Returning to decision block 704, if a registration message was received along with the network element identification code and node number from the wireless set, control is transferred to block 706 which sets up a TEI, CES, and virtual link object as illustrated by element 601, 602, and 603 of FIG. 6 in the second example. This is done since the wireless set has moved to a new switch node. Block 707 then sends the network element identification code, node number as received from the wireless set, and registration message to the network layer. The network layer will establish a LDCN such as LDCN 604 of FIG. 6 in the second example, and then transfer this information to the wireless call processing application. After execution of block 707, control is transferred back to decision block 701.

Returning to decision block 701, if the answer is no, control is transferred to decision block 712. Decision block 712 determines whether a message has been received from the network layer identifying a CES. This message is received when a wireless set has transferred to another switch node. If the answer is yes, block 713 removes the TEI, CES, and virtual link object as identified by the CES number in the message received from the network layer. The CES is determined from the network element identification code by the wireless call processing application. In the previous example, this occurred when wireless set 108 transferred from switch node 101 to switch node 124. In that case, virtual link object 433, CES 413, and TEI 501 were removed as illustrated in FIG. 5. If the answer in decision block 712 is no, block 714 performs normal processing before returning control back to decision block 701. The network layer would remove LDCN 423 as illustrated in FIG. 5.

Figure 8:
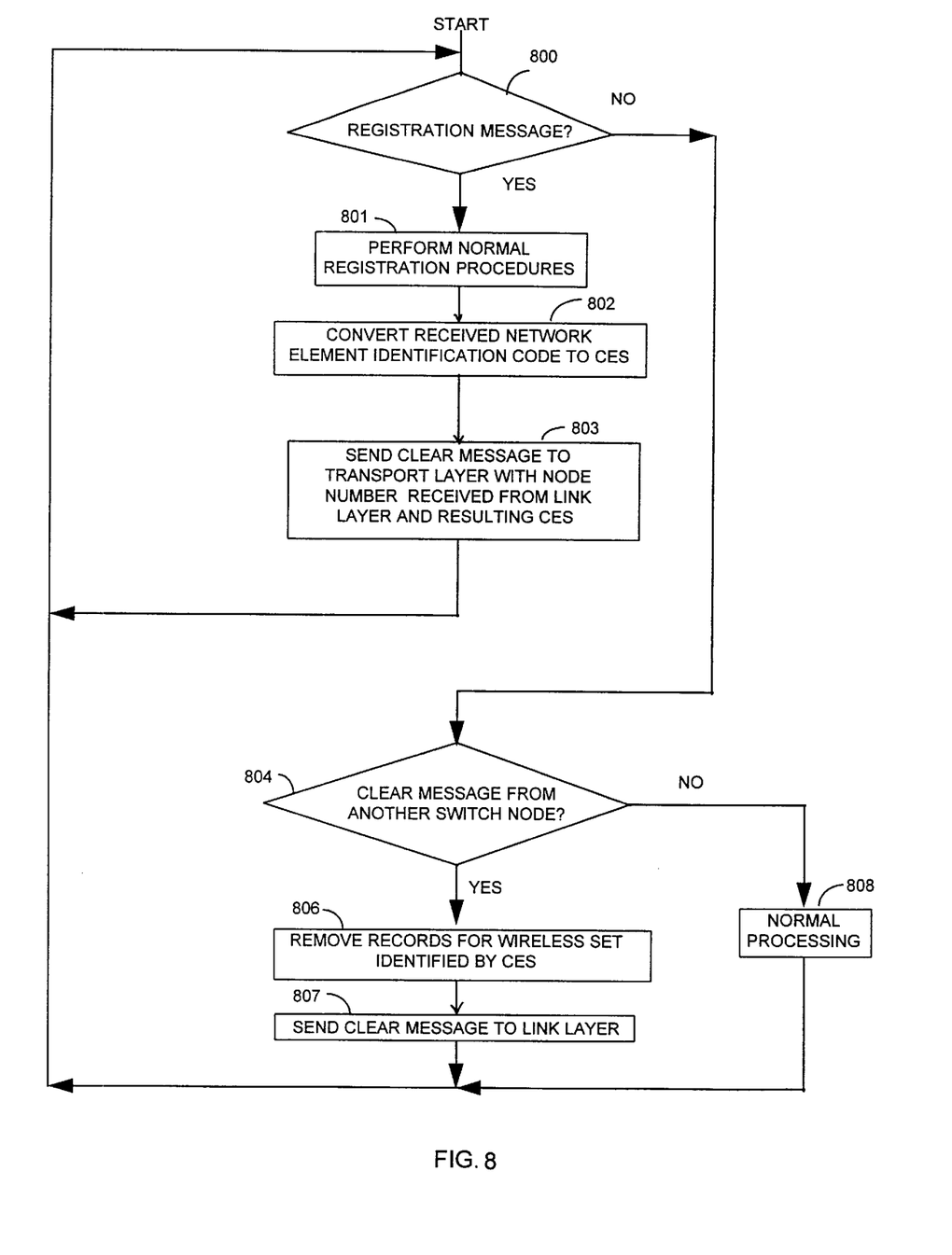
FIG. 8 illustrates, in flow chart form, the operations performed by a wireless call processing application in implementing the invention.

FIG. 8 illustrates, in block diagram form, the operations performed by a wireless call processing application such as wireless call processing application 317 of FIG. 3 in implementing the invention. Decision block 800 determines if a registration message has been received from the lower software layers. If the answer is yes, block 801 performs normal registration procedures, and block 802 converts the received network element identification code to corresponding CES. Block 803 sends a clear message via transport layer to the wireless call processing application of the switch node from which the wireless set performing the registration just transferred. If the wireless set had not transferred from a switch node within the wireless communication system as illustrated in FIG. 1, then no clear message is sent. The clear message is sent from the wireless call processing application to the transport layer with the node number received from the link layer and corresponding CES. The transport layer will then determine how the message should be routed to the other switch node. This message is identified that it is to go to the wireless call processing application in the other switch node.

Returning to decision block 801, in the answer is no, control is transferred to decision block 804 which determines if a clear message has been received from another switch node. If the answer is no, block 808 performs normal processing. If the answer in decision block 804 is yes, block 806 removes all records for the wireless set as identified by the CES determined by the network element identification code received from the other switch node. Block 807 sends a clear message to the link layer which is processed at the link layer by block 712 and 713 of FIG. 7.

Figure 9:
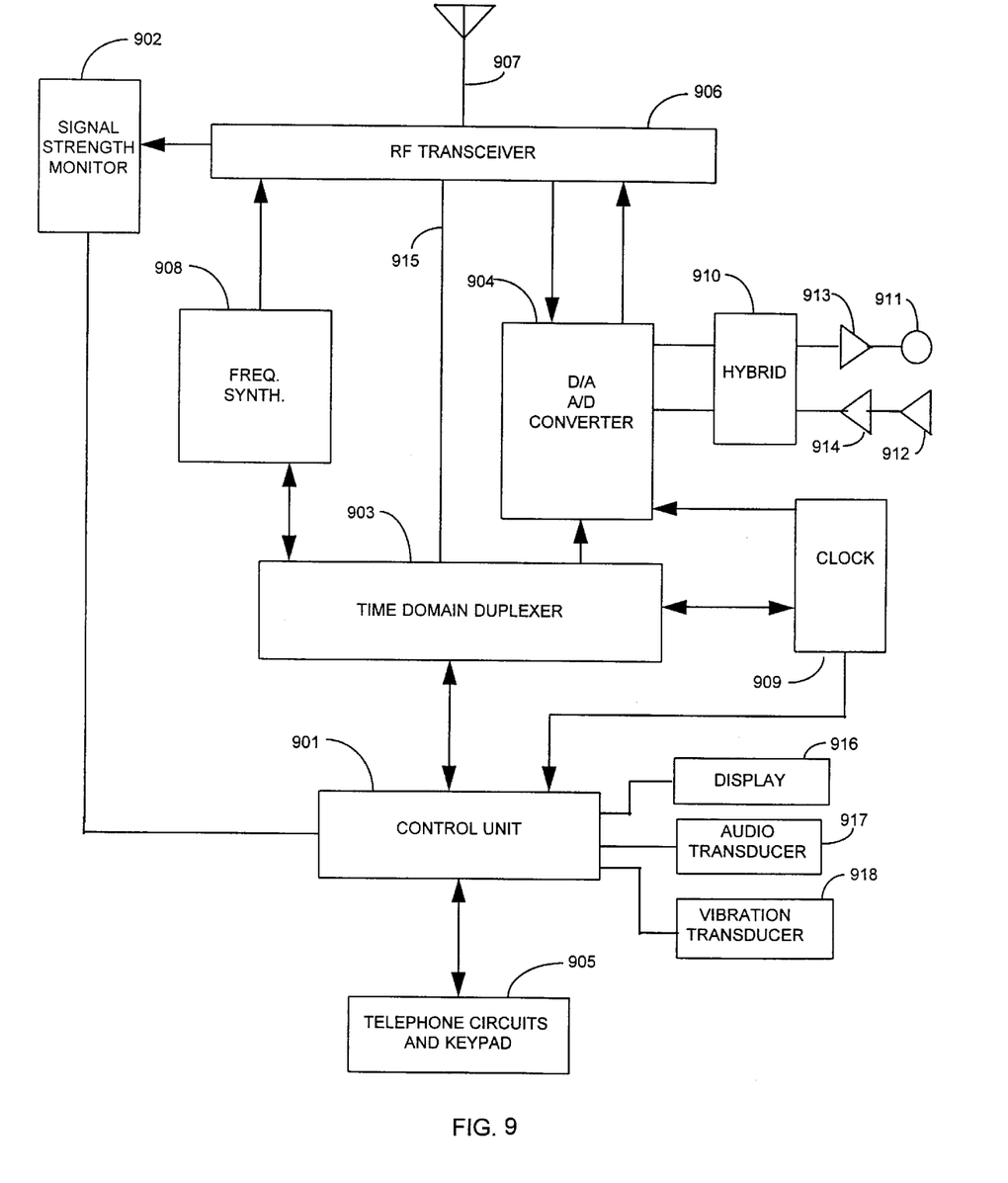
FIG. 9 illustrates, in block diagram form, a wireless set.

FIG. 9 illustrates wireless set 108 in greater detail. Components in this unit include control unit 901 and clock 909 for providing synchronization to: (1) control unit 901, (2) Time Domain Duplexer (TDD) 903, and (3) combined digital-to-analog and analog-to-digital (D/A+A/D) converter 904. Also included in wireless set 108 are RF transceiver 906, antenna 907, and frequency synthesizer 908. Telephone circuits and keypad section 905 permits dialing telephone digits and actuating control keys for placing and receiving telephone calls. Display 916, audio transducer 917, and vibration transducer 918 are utilized by control unit 901 to provide feedback to the user and to alert the user of various situations. The user is given the capability of muting audio transducer 917 in which case, control unit 901 will utilize vibration transducer 918 to alert the caller to incoming calls, etc.

Transceiver 906 comprises both an RF transmitter and an RF receiver. Transceiver 906 demodulates voice signals transmitted by a base station and couples these signals via the D/A section of converter 904 and hybrid 910 on to loudspeaker 912. Transceiver 906 receives its input analog speech signals from microphone 911. These analog speech signals are coupled to the transceiver via hybrid 910 and the A/D section of converter 904. Converter 904 converts the analog signals to digital signals which are then transmitted to RF transceiver 906. Conventional amplifiers 913 and 914 are employed for amplifying the analog speech signals obtained from microphone 911 and provided to loudspeaker 912. Control messages are transferred via time domain duplexer 903 to control unit 901.

Figure 10:
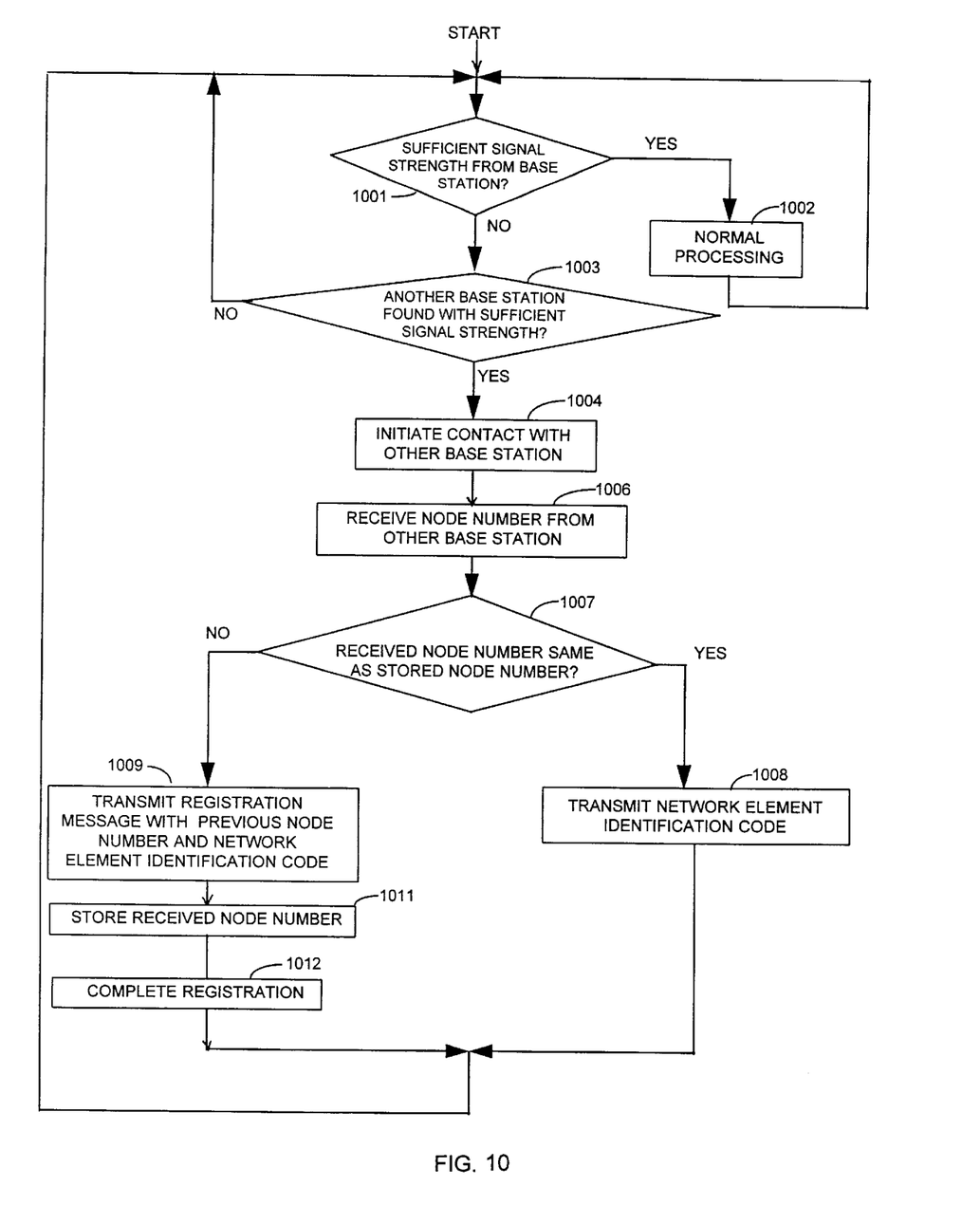
FIG. 10 illustrates, in flow chart form, the operations performed by a control unit of a wireless set in implementing the invention.

FIG. 10 illustrates, in block diagram form, the operations performed by a wireless set such as wireless set 108. Decision block 1001 determines if there is sufficient signal strength from the base station upon which the wireless set is presently communicating with. If the answer is yes, block 1002 performs the normal processing which may be required at this point in time. If the answer in decision block 1001 is no, decision block 1003 determines if there is another base station in the vicinity that does have sufficient strength. Control unit 901 which is executing the program illustrated in FIG. 10 utilizes signal strength monitor 902 of FIG. 9 to make the determinations in decision blocks 1001 and 1003. If the decision in decision block 1003 is no, control is transferred back to decision block 1001. If the decision in decision block 1003 is yes, block 1004 initiates contact with the other base station. The switch node to which the other base station is attached now proceeds with setting up a TEI at the link layer. Block 1006 receives the node number from the other base station designating the switch node to which the other base station is attached. Decision block 1007 determines if the wireless is starting communication with a base station that is attached to the same node as the previous base station utilized by the wireless set. If the answer is yes that it is the same switch node, block 1008 transmits the network element identification code to the link layer of the switch node via the other base station.

If the answer in decision block 1007 is no, block 1009 transmits a registration message which includes the network element identification code and node number of previous switch node to the other base station. Block 1011 then stores the receive node number replacing the previously stored node number. Block 1012 completes negotiation before control is transferred back to decision block 1001.

Figure 11:
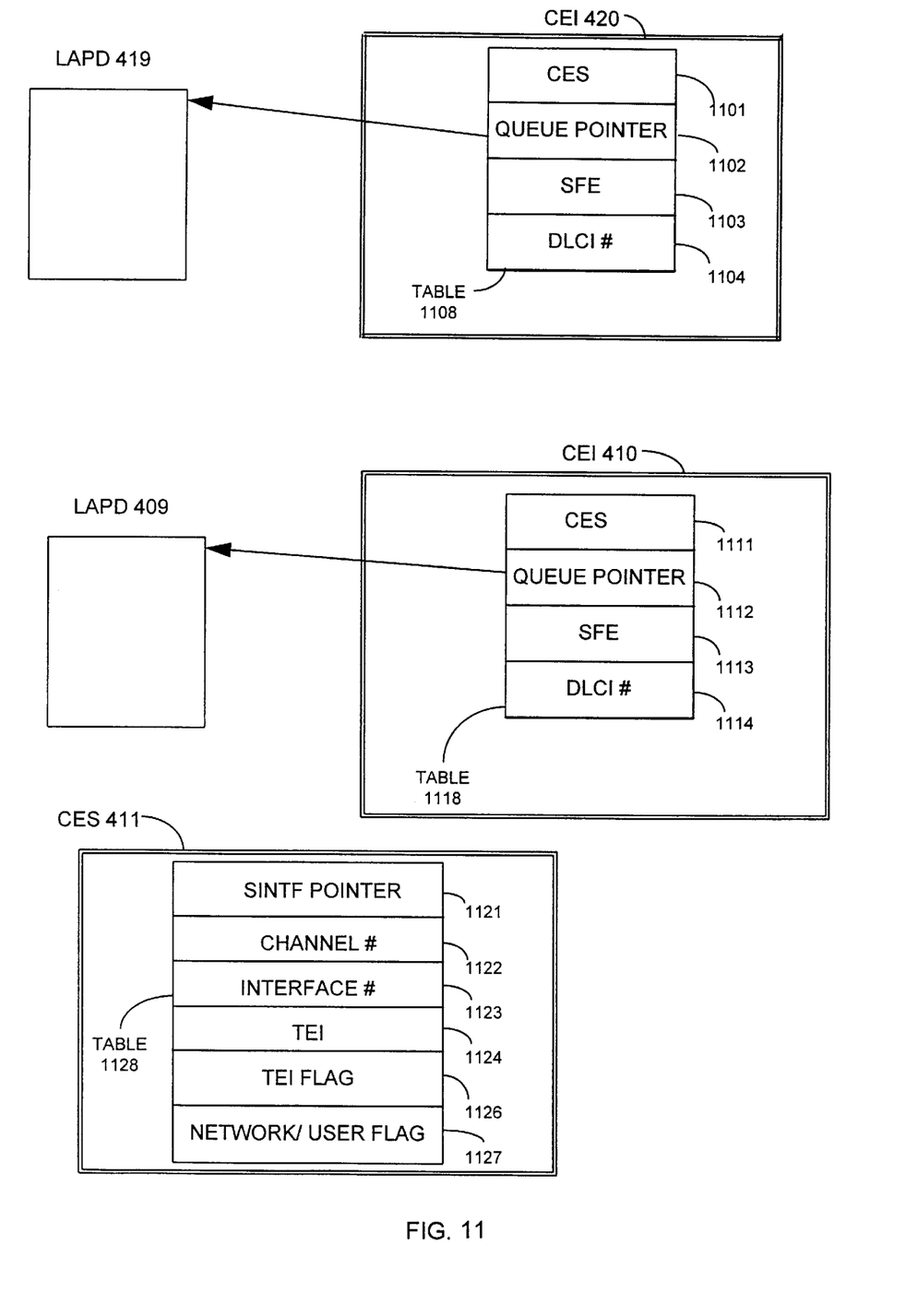
FIG. 11 illustrates tables used by a virtual link object.

FIG. 11 illustrates the tables that comprise CEI 410, CEI 420, and CES 411 as shown on FIG. 4. Within CEI 410 and CEI 420, the CES 1111 and CES 1101 entries in tables 1108 and 1118 respectively, define which CES of FIG. 4 is being utilized. Within CES 411, channel number 1122, interface number 1123 and TEI 1124 entries in table 1128 define which TEI such as TEI 411 of FIG. 4 is being utilized for communication of information. As previously described in the first example, when wireless set 108 moves from base station 102 to base station 103, the TEI, SINTF pointer, channel number and interface number entries similar to entries 1124, 1121, 1122 and 1123 are changed to reflect that TEI 501 is being utilized rather than TEI 403 as illustrated in FIG. 11. The interface number defines the physical interface, i.e., interface 304. In tables 1108, 1118, and 1128 the remainder of the entries are defined in U.S. Pat. No. 4,386,466 which is hereby incorporated by reference.

It is to be understood that the above-described embodiment is merely illustratively of the principles of the invention and that other arrangements may be devised by those skilled in the art without departing from the spirit and scope of the invention. In particular, other software structures could be utilized to represent the CEI and CES tables.

The invention claimed is:

1. A method of controlling a wireless switching network to maintain communication with a wireless set upon movement of the wireless set from a first base station to a second base station wherein the first and second base stations are each connected to the wireless switching network via a first and second individual communication link, respectively, comprising the steps of:

setting up a first physical object to control a physical protocol on the first communication link and a second physical object to control the physical protocol on the second communication link;

setting up a software object to control communication with the wireless set using a first layer of software protocol;

routing information for the wireless set from the first physical object to the software object;

detecting a link initialization on the second communication link by the wireless set; and routing information for the wireless set from the second physical object to the software object whereby communication is maintained with the wireless set via the second communication link and the second base station.

2. The method of claim 1 wherein the step of setting up the first physical object comprises the step of assigning to the wireless set a first physical protocol identifier and a first layer of software protocol identifier;

the step of detecting further comprises the step of assigning a second physical protocol identifier; and the step of routing comprises the step of identifying the second physical protocol identifier with the first layer of software protocol identifier.

3. The method of claim 2 wherein the wireless set has an unique network identification number and the first layer of software protocol identifier is based on the unique network identification number.

4. The method of claim 3 wherein the first and second physical protocol identifiers are termination endpoint identifiers and the first layer of software protocol identifier is a connection endpoint suffix.

5. The method of claim 4 wherein the wireless switching network comprises a plurality of switch nodes with a first switch node connected to the first and second base stations and a second switch node connected to a third base station via a third communication link and the step of detecting comprises the steps of transmitting a switch node identification number of the first switch node when the wireless set initializes via the first communication link;

storing the switch node identification number of the first switch node by the wireless set;

transmitting by the second switch node a switch node identification number of the second switch node upon detection of link initialization on the third communication link by the wireless set; and registering by the wireless set upon on the second switch node the stored switch node identification number and the transmitted second switch node identification number not being equal.

6. The method of claim 5 further comprises the step of transmitting by second switch node a request to the first switch node to remove the second physical object and the software object.

7. An apparatus for controlling a wireless switching network to maintain communication with a wireless set upon movement of the wireless set from a first base station to a second base station wherein the first and second base stations are each connected to the wireless switching network via a first and second individual communication link, respectively, comprising:

means for setting up a first physical object to control a physical protocol on the first communication link and a second physical object to control the physical protocol on the second communication link;

means for setting up a software object to control communication with the wireless set using a first layer of software protocol;

means for routing information for the wireless set from the first physical object to the software object;

means for detecting a link initialization on the second communication link by the wireless set; and means for routing information for the wireless set from the second physical object to the software object whereby communication is maintained with the wireless set via the second communication link and the second base station.

8. The apparatus of claim 7 wherein the means for setting up the first physical object comprises means for assigning to the wireless set a first physical protocol identifier and a first layer of software protocol identifier;

the means for detecting further comprises means for assigning a second physical protocol identifier; and the means for routing comprises means for identifying the second physical protocol identifier with the first layer of software protocol identifier.

9. The apparatus of claim 8 wherein the wireless set has an unique network identification number and the first layer of software protocol identifier is based on the unique network identification number.

10. The apparatus of claim 9 wherein the first and second physical protocol identifiers are termination endpoint identifiers and the first layer of software protocol identifier is a connection endpoint suffix.

11. The apparatus of claim 10 wherein the wireless switching network comprises a plurality of switch nodes with a first switch node connected to the first and second base stations and a second switch node connected to a third base station via a third communication link and the means for detecting comprises means for transmitting a switch node identification number of the first switch node when the wireless set initializes via the first communication link;

means for storing the switch node identification number of the first switch node by the wireless set;

means for transmitting by the second switch node a switch node identification number of the second switch node upon detection of link initialization on the third communication link by the wireless set; and means for registering by the wireless set on the second switch node upon the stored switch node identification number and the transmitted second switch node identification number not being equal.

12. The apparatus of claim 11 further comprises means for transmitting by second switch node a request to the first switch node to remove the second physical object and the software object.

* * * * *